Jan. 23, 1962

F. W. BIRELEY ET AL 3,017,821

FRUIT JUICE EXTRACTOR

Filed June 26, 1956

INVENTORS.
FRANK W. BIRELEY.
BY HARRY A. FOSS

Paul A. Weilein
ATTORNEY.

Jan. 23, 1962  F. W. BIRELEY ET AL  3,017,821
FRUIT JUICE EXTRACTOR
Filed June 26, 1956  11 Sheets-Sheet 2
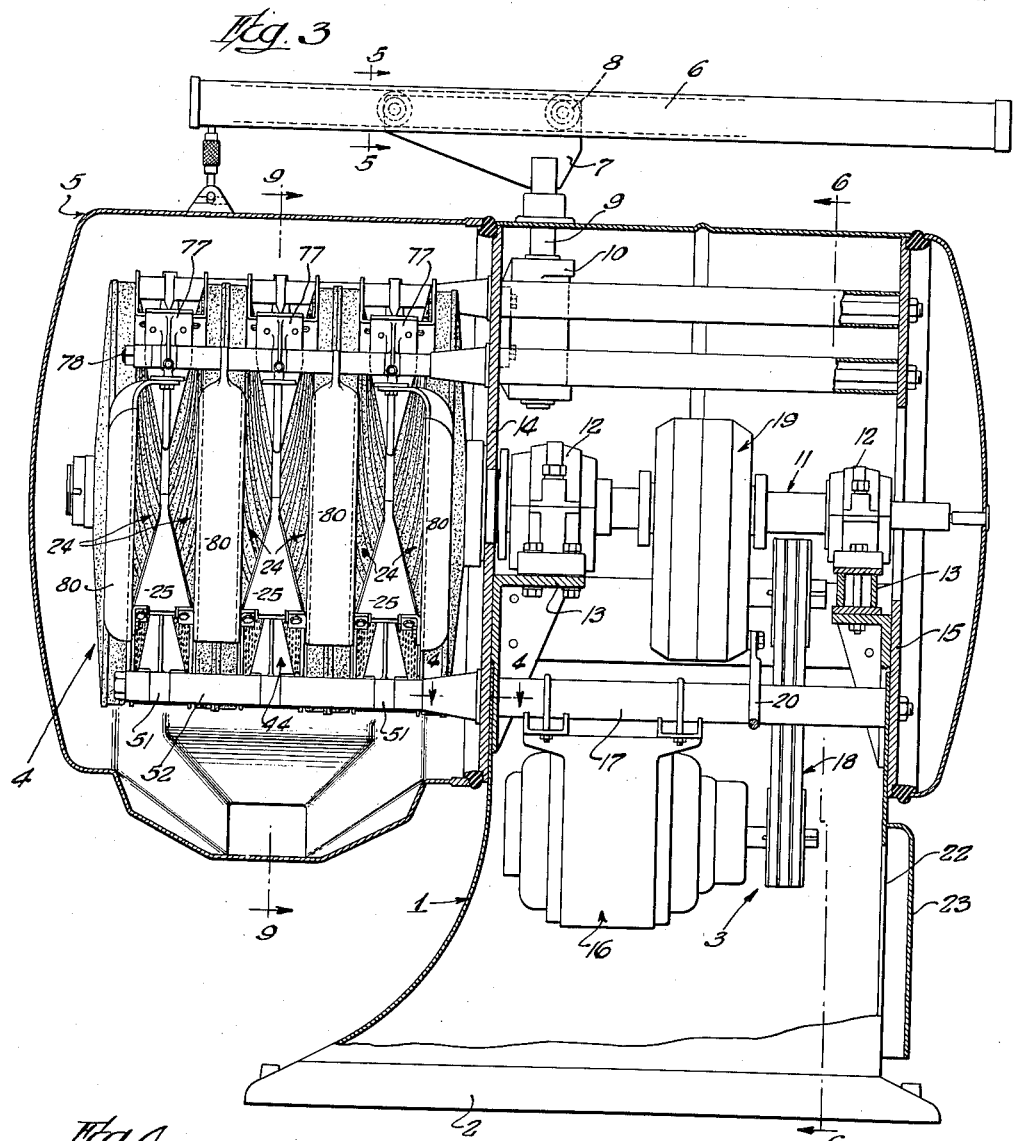
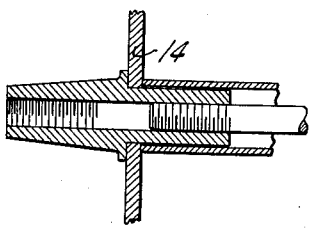
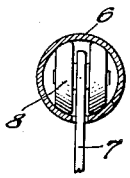
INVENTORS.
FRANK W. BIRELEY
BY    HARRY A. FOSS
Paul A. Weilein
ATTORNEY.

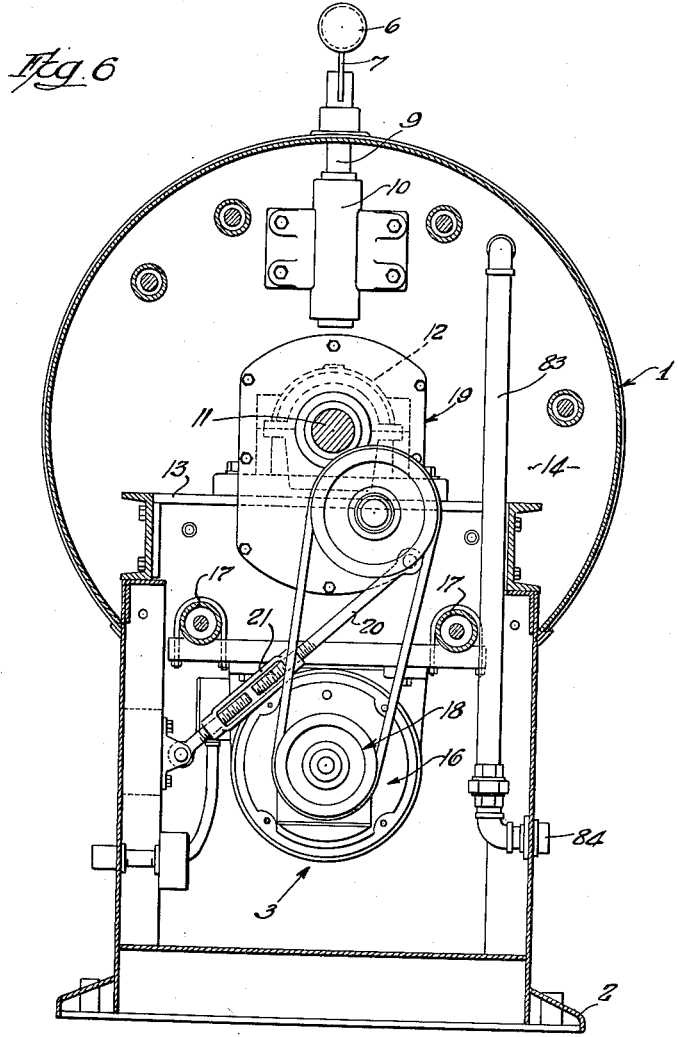

Jan. 23, 1962  F. W. BIRELEY ET AL  3,017,821
FRUIT JUICE EXTRACTOR
Filed June 26, 1956  11 Sheets-Sheet 4

INVENTORS.
FRANK W. BIRELEY
BY  HARRY A. FOSS
Paul A. Weilein
ATTORNEY.

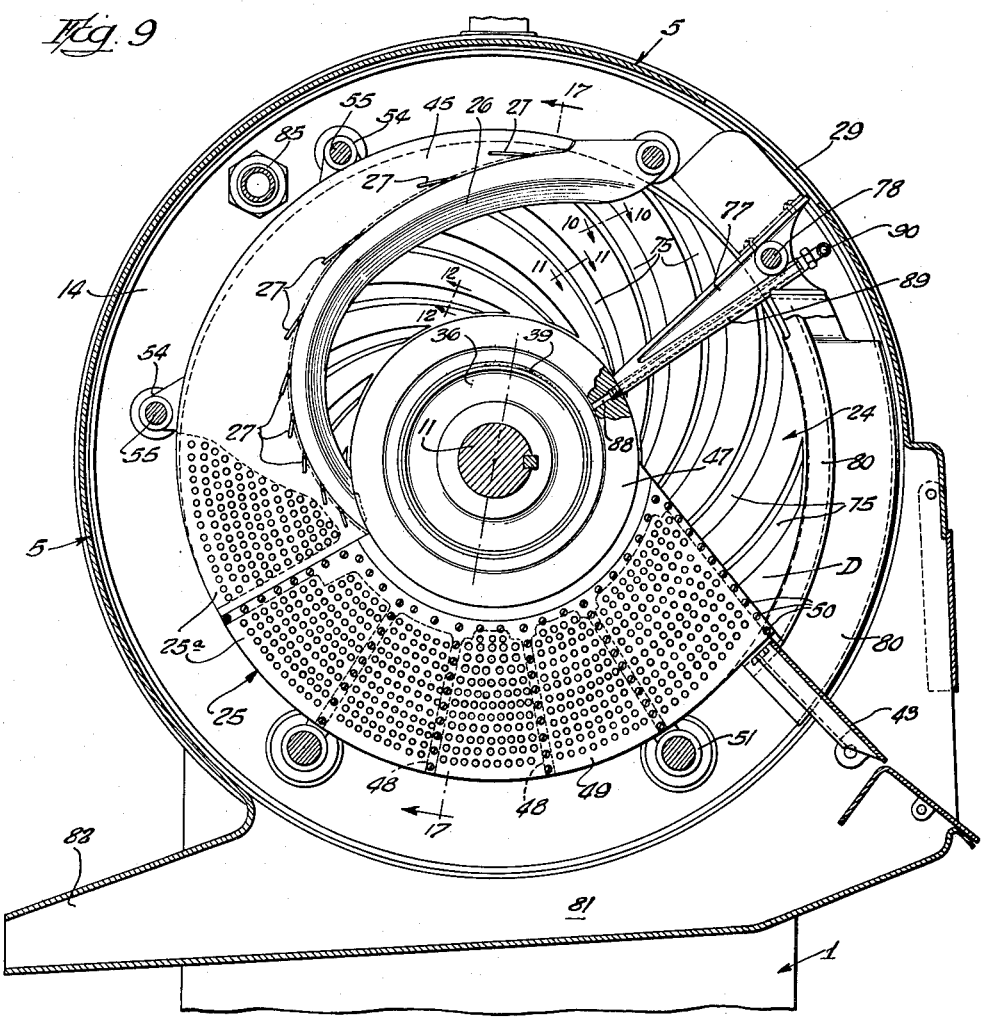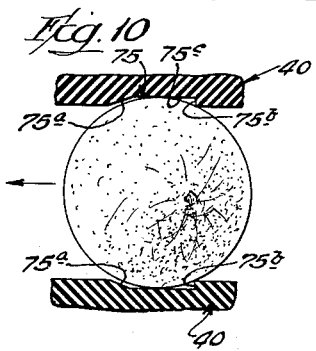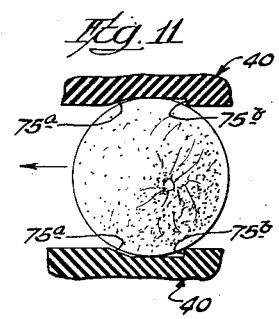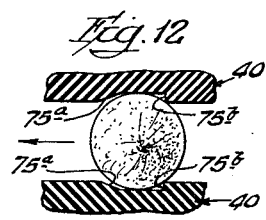

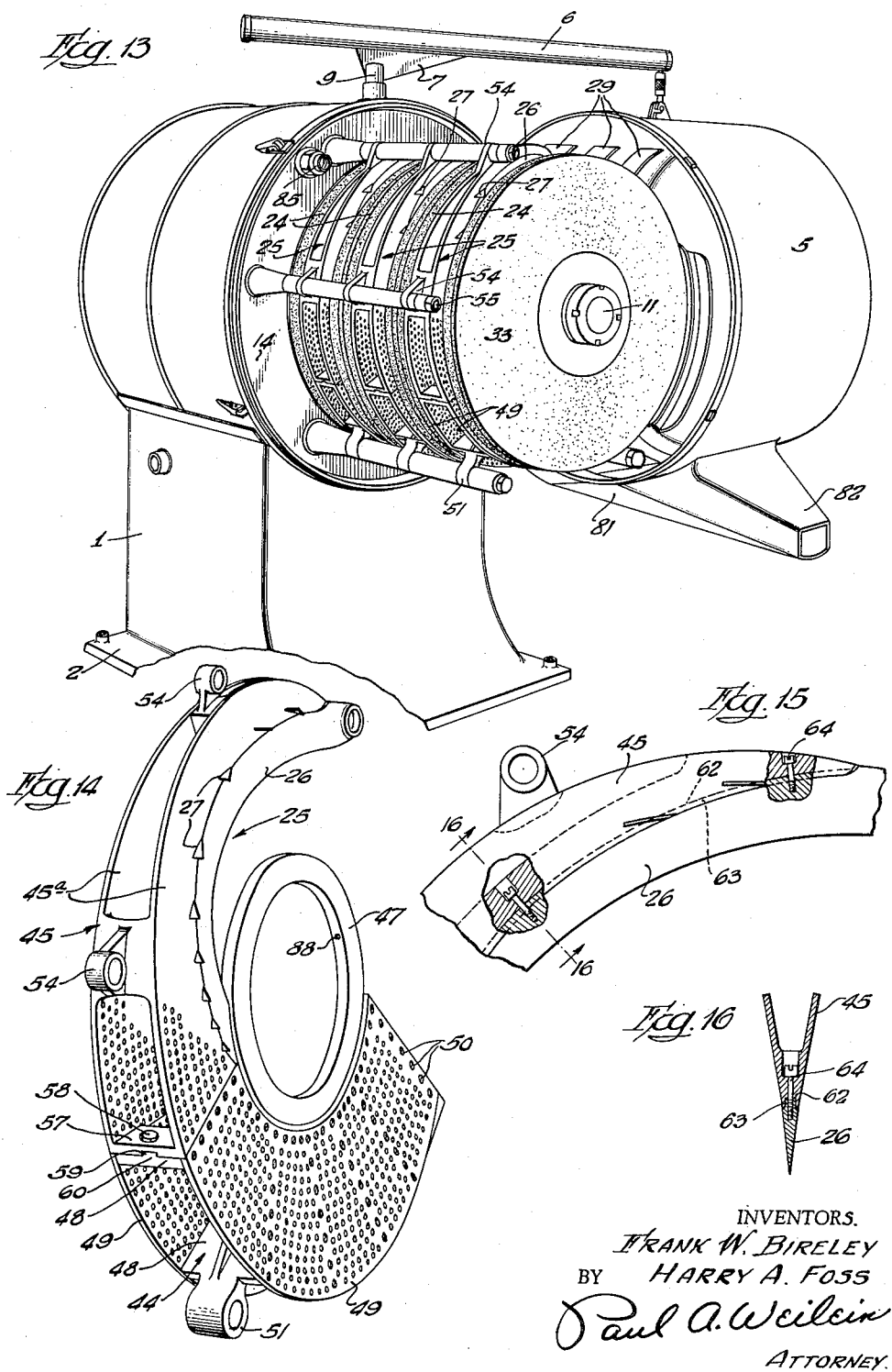

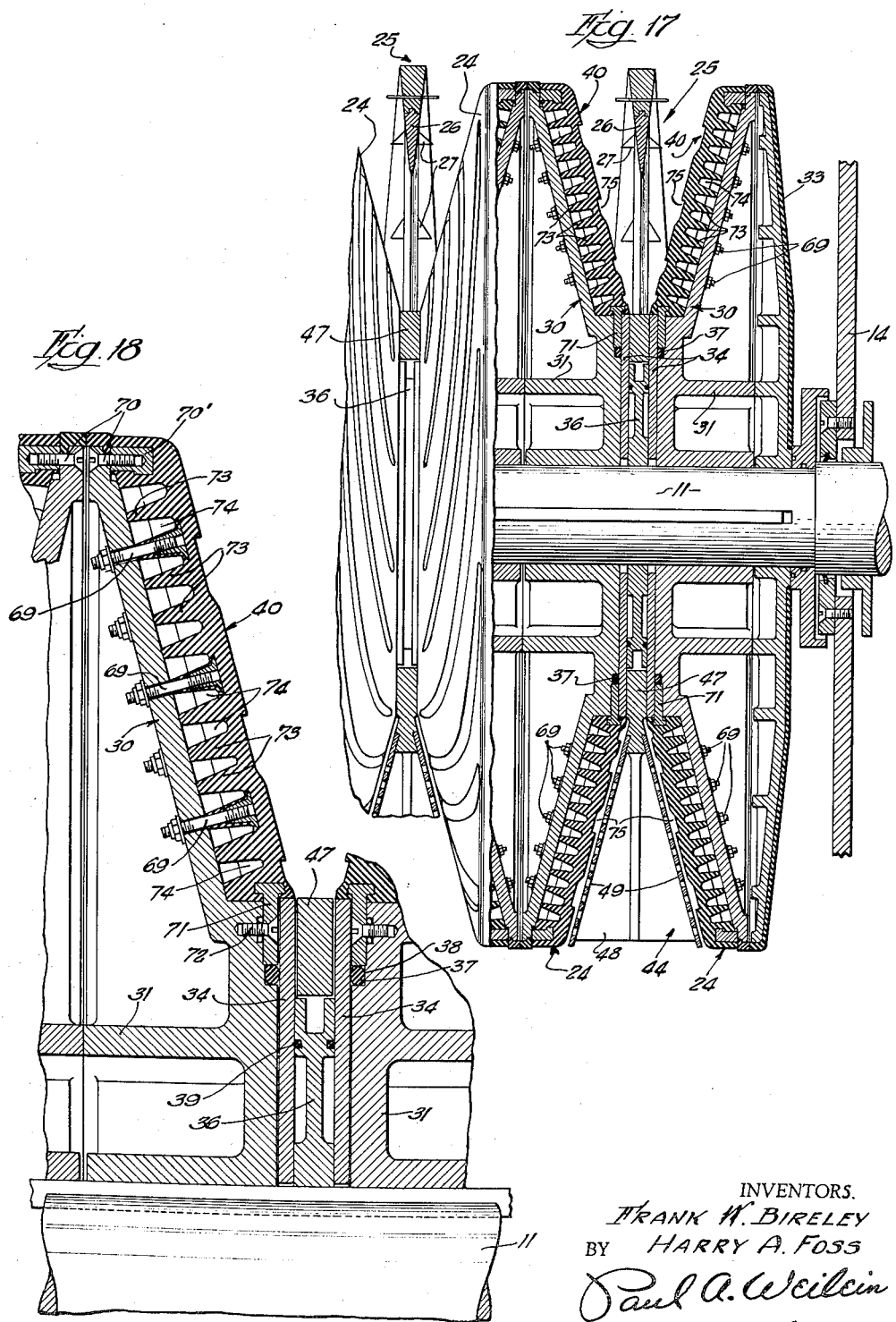

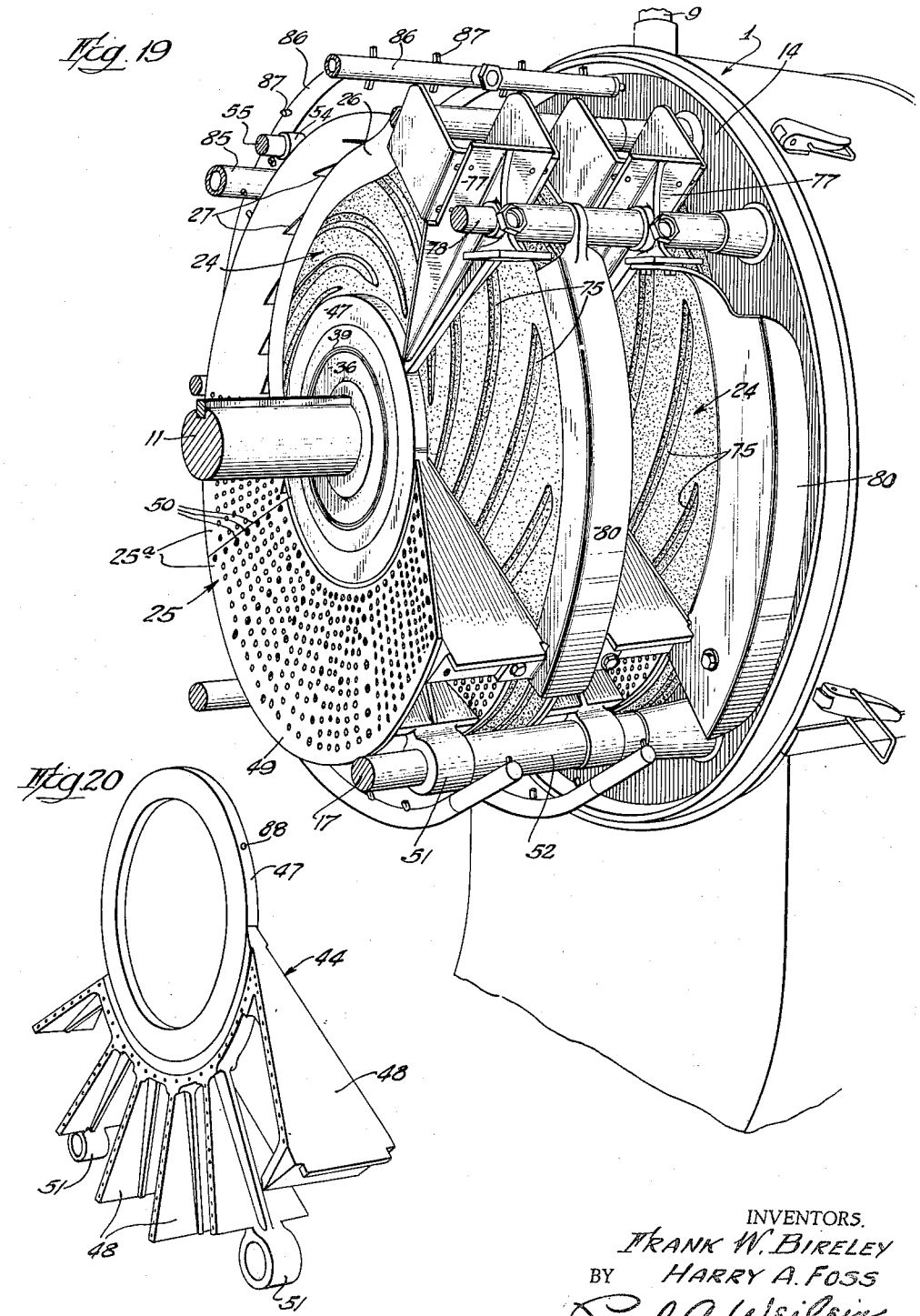

Jan. 23, 1962  F. W. BIRELEY ET AL  3,017,821
FRUIT JUICE EXTRACTOR
Filed June 26, 1956  11 Sheets-Sheet 9
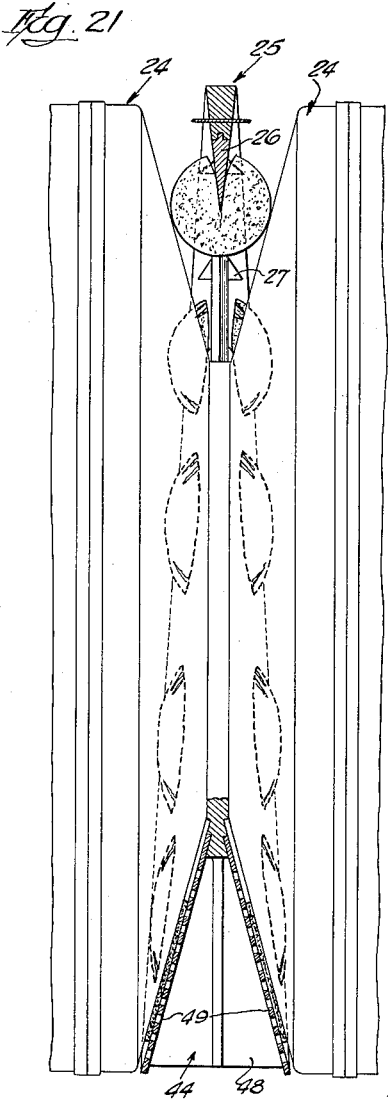
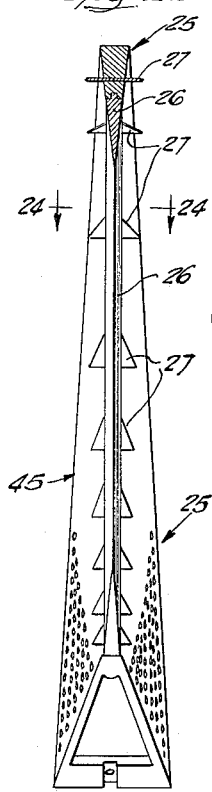
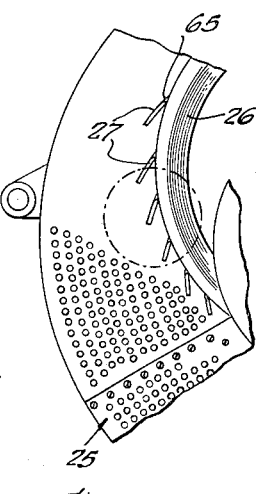
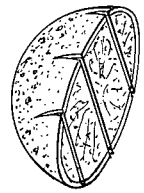
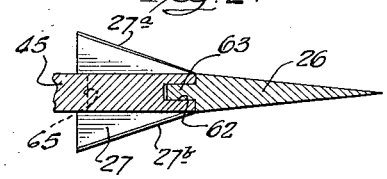
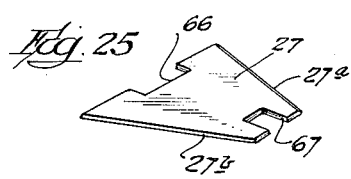
INVENTORS.
FRANK W. BIRELEY.
BY HARRY A. FOSS
Paul A. Weilein
ATTORNEY.

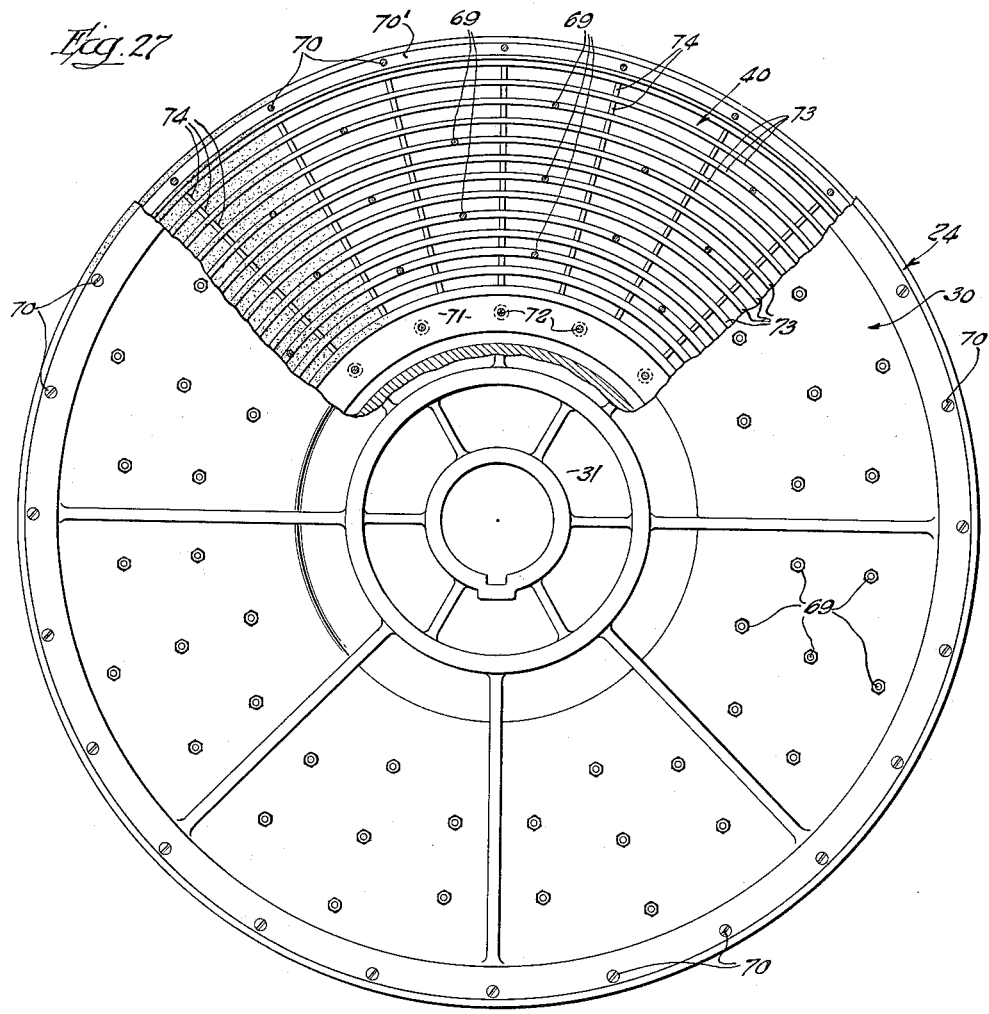

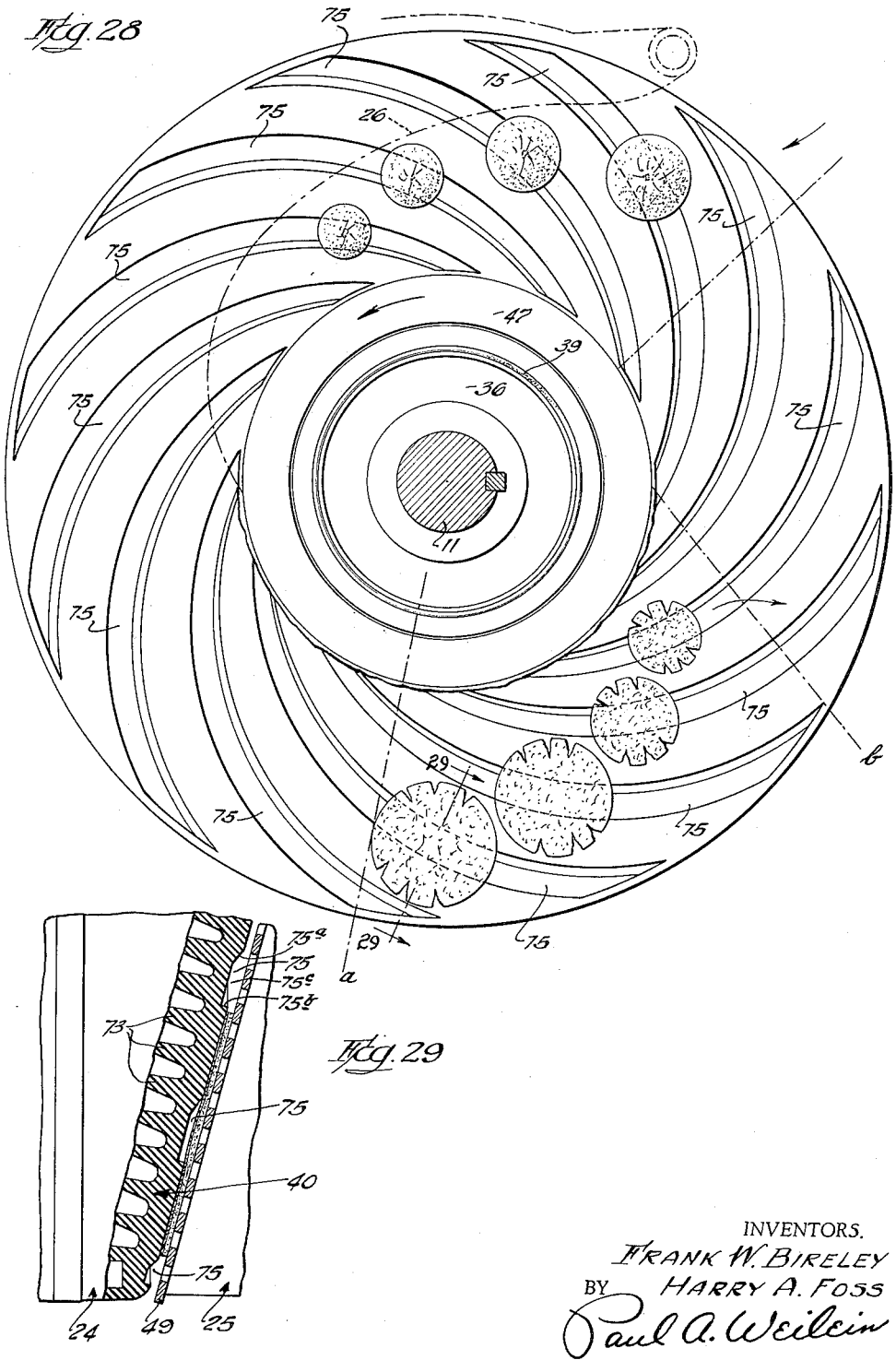

United States Patent Office 3,017,821
Patented Jan. 23, 1962

3,017,821
FRUIT JUICE EXTRACTOR
Frank W. Bireley, North Hollywood, and Harry A. Foss, Sunland, Calif., assignors, by direct and mesne assignments, to Brown Citrus Machinery Corp., Whittier, Calif., a corporation of California
Filed June 26, 1956, Ser. No. 593,991
31 Claims. (Cl. 100—97)

This invention relates to apparatus for extracting juice from citrus fruit, particularly apparatus of the type shown in applications for U.S. Letters Patent, Serial No. 180,658, filed August 21, 1950 which issued as Patent No. 2,767,644, and Serial No. 247,105, filed September 18, 1951 which issued as Patent No. 2,767,645.

Juice extracting apparatus of the type shown in the above identified applications, includes one or more pairs of opposed rotary members arranged to rotate about a common axis. The opposed surfaces of the rotary members of each pair, converge toward this common axis to provide therebetween an annular, wedge-shaped fruit-receiving space whereby citrus fruit of different sizes deposited therein will be wedged between said rotary members at different distances from the common axis according to the size of the fruit. Thus wedged, the fruit is advanced in different arcuate paths as the rotary members are rotated.

A stationary pressure-applying member is mounted in a portion of the annular space between the rotary members of each pair, with portions of the walls thereof converging toward the opposed surfaces of the rotary members in the direction of rotation of the latter to define therewith converging pressure paths on opposite sides of the stationary member.

A bisecting knife and slitting knives are provided between the rotary members of each pair in advance of the associated stationary member, the slitting knives being located behind the bisecting knife. In the operation of the apparatus, the bisecting knives cut the fruit in half and the slitting knives slit across the cut faces and rind edges of the fruit halves during advance of the latter by the rotary members.

The halves are moved from the bisecting knives into the pressure paths where they are subjected to a progressively increasing pressure during advance thereof, to express the juice therefrom, the juice passing through perforations in walls of the stationary member and being then run off in any suitable manner.

It is an object of the present invention to provide improved juice extracting apparatus of the character described in which novel juice extraction means are operable in a particularly efficient manner to effect a maximum yeld of juice with a minimum amount of rind oil and albedo from each half of a plurality of citrus fruit halves simultaneously subjected to such juice extraction operation.

It is another object of this invention to provide apparatus such as described in which fruit halves of different sizes are simultaneously subjected to a juice extraction operation in such a manner that the intensity of the extraction operation, that is, the pressure to which the fruit halves are subjected is automatically varied according to the size of each half whereby the desired amount of juice will be expressed from each half with a minimum of rind oil and albedo.

It is another object of this invention to provide apparatus such as described having an improved means for advancing halves of citrus fruit of different sizes in separate pressure-applying paths according to the size of the halves, wherein the advancing means includes a cushioning means formed and arranged to engage the rind surfaces of the halves so as to vary the force of the juice extracting pressure according to the size of the halves as the latter are advanced in said paths.

It is another object of this invention to provide juice extracting apparatus such as described which is constructed and arranged so that the size of the fruit continuously fed to the apparatus, is a factor determining the force of the extraction pressure to which each piece of the fruit is automatically subjected, whether these pieces of fruit are of the same size or widely different in size, to the end that each piece of fruit regardless of size will be treated in a manner best to express therefrom substantially all of the juice without releasing an objectionable amount of rind oil and albedo.

Another object of this invention is the provision in apparatus such as described, of improved means for gripping and advancing each piece of fruit through separate pressure-applying paths according to the sizes of the halves, wherein the advancing means includes cushioned fruit gripping elements having grooves therein of such form and arrangement as will maintain the fruit in predetermined paths according to the size of the fruit without causing the fruit in one path to overlap the fruit in an adjacent path during the application of pressure thereto, as well as when the fruit is subjected to maximum pressure and is flattened in such paths.

Another object of this invention is to provide juice extracting apparatus of the character described wherein the opposed rotary fruit advancing members have cushioned fruit engaging surfaces progressively decreasing in yieldability toward the common axis on which the rotary members are mounted, whereby the juice extracting pressure will vary according to the size of the fruit in a manner preventing the release of objectionable amounts of rind oil and albedo while effecting the desired yield of juice.

A further object of this invention is the provision of an improved arrangement of slitting knives which assures that the citrus fruit halves of different sizes will be given a number of slits across the cut faces and rind edges in a manner making it possible to subject the halves to a flattening pressure for releasing the juice without abrading the halves or subjecting them to treatment which would cause the release of objectionable amounts of rind oil and albedo.

It is another object of this invention to provide a citrus fruit juice extractor of the character described wherein novel means are operable to simultaneously advance citrus fruit of different sizes in one direction in different paths spaced one from the other in a direction transverse to the direction of advance according to the size of the fruit, and wherein novel means cooperates with the advancing means for subjecting the fruit during such advance to juice extracting pressures which differ in duration and force in such paths, whereby each piece of fruit regardless of size will be subjected to a juice extracting treatment that will express all of the juice therefrom without releasing objectionable amounts of rind oil and albedo.

This invention possesses many other advantages and has other objects which may be made more apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

FIG. 3 is a sectional view partly in elevation on an enlarged scale, taken substantially on the line 3—3 of FIG. 2, showing in elevation the juice extracting mechanism and the operating mechanism therefor;

FIG. 4 is a fragmentary detail sectional view taken on the line 4—4 of FIG. 3;

FIG. 5 is a fragmentary cross-sectional view of another detail taken on the line 5—5 of FIG. 3;

FIG. 6 is a sectional view partly in elevation taken on the line 6—6 of FIG. 3;

FIG. 9 is a sectional view on an enlarged scale, taken substantially on the line 9—9 of FIG. 3;

FIG. 10 is a detail sectional view taken on the line 10—10 of FIG. 9, showing how an orange is held between cushioning members of the extracting mechanism;

FIG. 11 is a sectional view similar to FIG. 10, taken on the line 11—11 of FIG. 9;

FIG. 12 is a sectional view similar to FIG. 10, taken on the line 12—12 of FIG. 9;

FIG. 13 is a perspective view similar to FIG. 1, showing one of the housings swung out of the position in which it encloses the extracting mechanism;

FIG. 14 is a perspective view of one of the stationary members of the extracting mechanism;

FIG. 15 is a fragmentary side elevation partly in section of the upper part of the stationary member shown in FIG. 14, showing how the bisecting knife is fixed to the stationary member;

FIG. 16 is a cross sectional view taken on the line 16—16 of FIG. 15;

FIG. 17 is a fragmentary sectional view on an enlarged scale taken on the plane of line 17—17 of FIG. 9, showing a pair of related rotary members of the extracting mechanism in cross section and portions of an adjacent pair of rotary members in elevation, also showing portions of the stationary members between the pairs of rotary members;

FIG. 18 is a fragmentary sectional view similar to FIG. 13, illustrating on an enlarged scale details of the fruit-engaging cushioning members and the manner of fixing them to the rotary members;

FIG. 19 is a fragmentary perspective view similar to FIG. 7 showing details of the construction of the extracting mechanism on a larger scale than in FIG. 7;

FIG. 20 is a perspective view of a casting forming a part of the body of the stationary member shown in FIG. 14;

FIG. 21 is a fragmentary schematic elevational view looking into the extracting mechanism from the right side of FIG. 9, for example from the section line 17—17 to the left, showing how the fruit is bisected, by the slitting knives, and progressively flattened;

FIG. 22 is an elevational view partly in section of a casting forming the upper part of the body of the stationary member shown in FIG. 14, the upper end thereof being sectioned;

FIG. 23 is a fragmentary side elevation of the stationary member shown in FIG. 14, showing how a fruit half is given three slits by the slitting knives, across the cut faces and rind edges of the half;

FIG. 24 is a cross-sectional view taken on the line 24—24 of FIG. 22;

FIG. 25 is a perspective view of one of the slitting knives;

FIG. 26 is a perspective view of a fruit half showing the manner in which slits are cut through the cut faces and rind edges thereof;

FIG. 27 is an enlarged elevational view of the back of one of the rotary members of the extracting mechanism, with a portion broken away to show the ribbed formation on the back of the cushioned fruit-engaging member on the rotary member;

Figure 1:
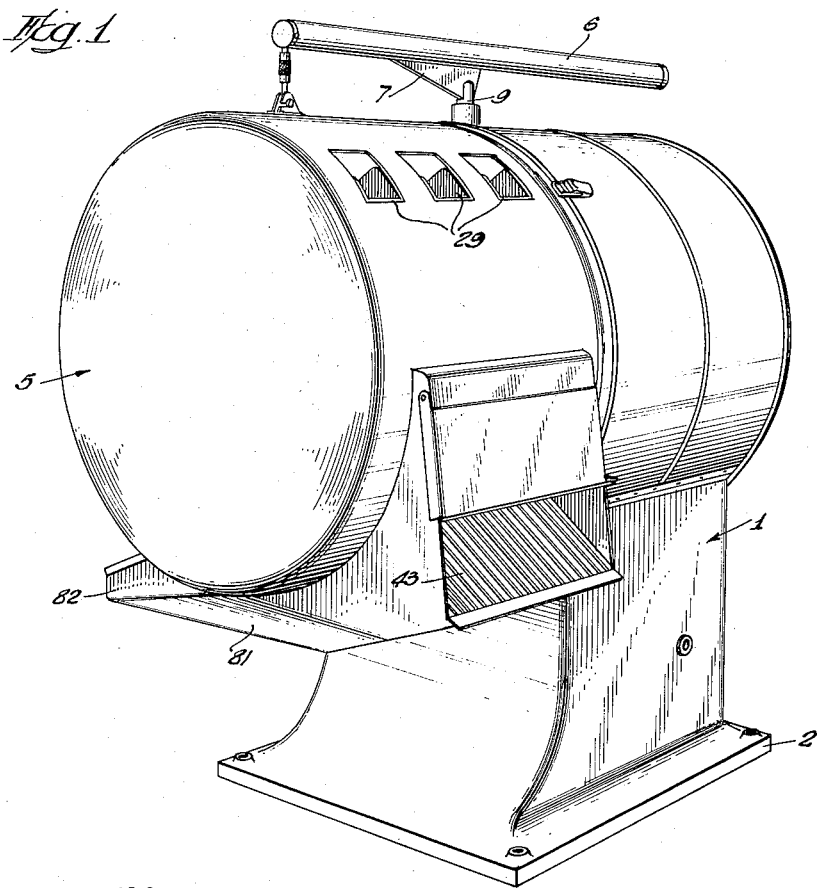
FIG. 1 is a perspective view of a juice extracting apparatus embodying the present invention.

FIG. 28 is a front elevational view of the rotary member shown in FIG. 27, showing the grooved formation of the fruit-engaging surface of the cushioning member; and illustrating a typical position of whole and flattened fruit as the fruit would appear at different stages of treatment in the apparatus; and FIG. 29 is a sectional view on an enlarged scale taken on the plane of line 29—29 of FIG. 28, showing how the fruit is flattened between one of the rotary members and its associated stationary member.

As shown in the accompanying drawings, an embodiment of the present invention includes a main housing 1 supported on a base 2 and enclosing driving means 3 for juice extracting mechanism 4, the latter being enclosed in a housing 5, supported by the housing 1.

An arm 6 mounted on the housing 1, supports the housing 5 so that it may be swung into and from a position enclosing the juice extracting mechanism 4. The arm 6 is tubular and slotted along its bottom for reception of a supporting plate 7 mounting rollers 8, disposed within the arm whereby the arm may be extended and retracted relative to the plate. The plate 7 is supported by an upright shaft 9, mounted to swivel in a bearing 10 within the housing 1. This provides for axial movement of the arm and a swinging thereof about the shaft 9 to move the housing 5 into and from position enclosing the mechanism 4.

The extracting mechanism 4 is driven by a rotary shaft 11 (FIGS. 3 and 6), journalled in bearings 12 on brackets 13 secured to frame members 14 and 15 of a suitable frame structure combined with the housing 1. A portion of the shaft 11 extends into the housing 5 for supporting as well as driving the rotary elements of the juice extracting mechanism 4.

The driving means 3 for the extracting mechanism 4, includes an electric motor 16, suspended, as shown in FIGS. 3 and 6, from cross rods 17 secured to the frame members 14 and 15. This motor, through a belt and pulley drive means 18 and a gear reduction unit 19, drives the shaft 11 at the desired rate of speed.

The gear reduction unit 19 is supported by the shaft 11 and a sectional torque rod 20 fastened at its ends to the gear reduction unit 19 and the housing 1. The sections of this rod are joined by a turn buckle 21, whereby the rod may be adjusted as to length to serve as an effective support and brace for the gear reduction unit.

An opening 22 in the housing 1, covered by a removable section 23, affords access to the drive means for changing the motor driven pulley of the drive means 18 to obtain the desired speed of rotation of the shaft 11.

Figure 7:
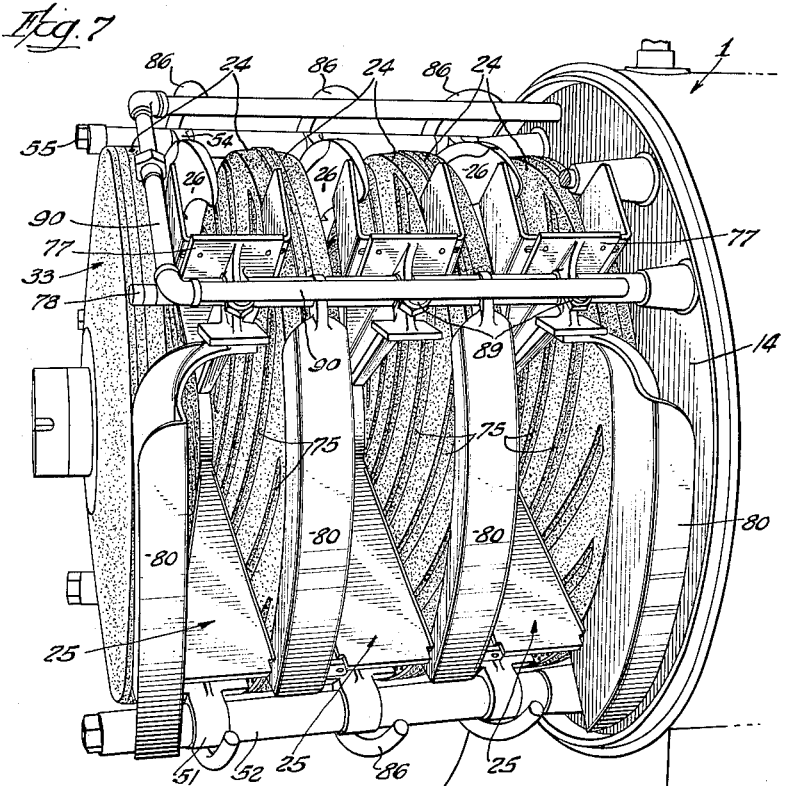
FIG. 7 is a perspective view of the juice extracting mechanism, with the housing therefor removed.
Figure 8:
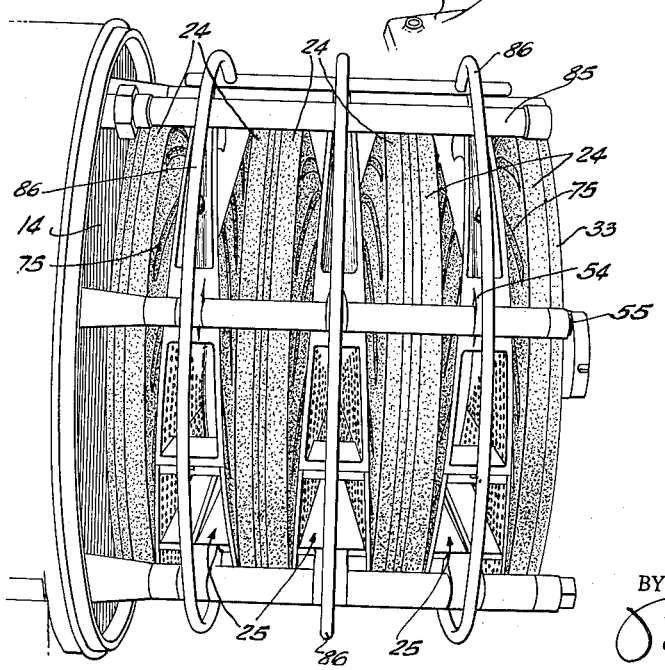
FIG. 8 is a perspective view of the extracting mechanism shown in FIG. 7, as seen from the side opposite that in the foreground of FIG. 7.

The fruit extracting mechanism 4, as here shown (see FIGS. 7, 8 and 17), generally includes three pairs of rotary members 24 and three stationary members 25, although it is obvious any number of pairs of such members may be used. The rotary members are driven in the same direction and simultaneously by the shaft 11. One of the stationary members 25 is disposed between the rotary members of each pair. Also disposed between the rotary members of each pair are a bisecting knife 26 and slitting knives 27.

Figure 2:
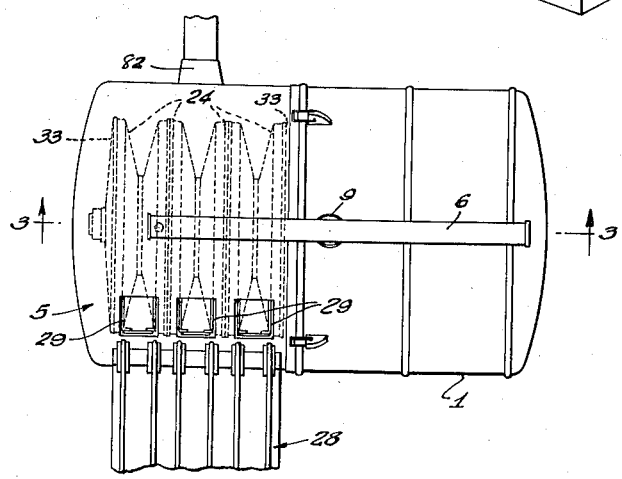
FIG. 2 is a top plan view of the apparatus shown in FIG. 1.

As indicated in FIG. 2, whole fruit is fed from conveyor means 28 through openings 29 in the housing 5 so as to drop between the rotary members 24 of each pair. The rotary members advance the fruit so that it will be bisected by the knife 26, cut by the slitting knives 27 across the cut face and rind edges of the halves, and subsequently subjected to pressure between the stationary and rotary members for the purpose of expressing juice therefrom.

Each of the rotary members 24 comprises a circular, concave-convex rigid disk 30 (see FIG. 17) having a hub 31 keyed on the shaft 11, so that the convex surfaces of the disks of each pair are in opposed spaced relation to one another. As a result of this arrangement, the opposed surfaces of the rotary member 24 converge toward the axis of the rotary members of each pair so as to define therebetween an annular wedge-shaped, fruit-receiving space such that whole citrus fruit of different sizes deposited therein, will be wedged between the rotary members at different distances from the axis thereof according to the size of the fruit.

Those of the rotary members having their concave faces opposed to one another, as best shown in FIG. 17, are disposed in abutting relation at their outer peripheries as well as at the hub portions thereof. Each of the outermost or end rotary members 24 on the shaft 11 have their concave sides closed by means of a circular disk 33 secured in place in any suitable manner.

Annular wear plates 34 (see FIGS. 17 and 18) mounted between the hubs 31 of the rotary members of each pair are separated by a spacer ring 36 keyed to the shaft 11. The outer surfaces of these plates engage sealing rings 37 mounted in grooves 38 in the hub portions of the members 24. The opposed surfaces of the wear plates engage sealing rings 39 carried by the spacer ring 36 (see FIG. 18).

In accordance with this invention, an annular resilient cushioning element 40 (see FIGS. 17 and 18) is provided on the convex surface of each of the rotary members 24 for frictionally and yieldably gripping the fruit in a manner and for the purpose to be hereinafter fully described.

The stationary members 25 are constructed and arranged to define with the rotary members 24 arcuate fruit-receiving spaces which progressively narrow in the direction of rotation of the rotary members. Thus, each stationary member 25 is generally arcuate and has opposite side walls 25 which for a part of the length thereof, converge toward the convex surfaces of the related pair of rotary members 24, in the direction of rotation of the rotary members, whereby two arcuate and progressively narrowing fruit-receiving spaces, or what may be termed pressure paths, are provided between each stationary member 25 and the two convex surfaces of the rotary members 24 opposed thereto. These paths extend arcuately about the axis of the rotary members 24, from the related bisecting knife 26, terminating at a discharge chute 43 where the spent fruit is discharged from the housing 5.

Each stationary member 25 (see FIG. 14) includes a body formed of sections 44 and 45 shown in FIGS. 20 and 22, respectively. As shown in FIG. 20, the body section 44 is a casting providing an annular mounting hub 47 and a series of plate-like members 48 extending radially from the lower portion of the hub in an arcuate row. The members 48 are spaced from one another and support a pair of arcuate, perforated pressure plate 49, which constitute portions of the side walls 25a (FIG. 19). These pressure plates are secured to the side edge of the members 48 by means of countersunk screws 50. The several members 48 are wedge-shaped and increase in width toward their outer ends so that the pressure plates 49 are inclined with respect to the vertical, with their outer surfaces disposed to cooperate with the convex surfaces of the rotary members in exerting pressure on the fruit halves advanced by the rotary members along the pressure plates.

In the present embodiment, there are six of the wedge-shaped members 48. The first two of these members, reading from the left end thereof as seen in FIGS. 14 and 20, are narrower transversely than the remaining members, the second of the first two members being somewhat wider transversely than the first of such members. With this arrangement the portions of the pressure plates 49 which extend between the first three members 48, reading from left to right, converge toward the convex surfaces of the rotary members in the direction of rotation of the rotary members 24. From the third member 48 to the right hand end of the row of these members, the pressure plates 49 are substantially parallel with the opposed convex surfaces of the rotary members so that the fruit halves passing between these parallel surfaces are flattened and maintained under the same pressure throughout the advance thereof along such surfaces.

Certain of the members 48 are provided, on the outer ends, with integral collars 51 mounted on extensions 52 of the cross rods 17, thereby holding the body section 44 in place. The extensions 52 are joined to the rods 17 by the coupling means 53 shown in FIG. 4. The mounting hub 47 of the section 44 is disposed between the wear plates 41 in surrounding relation to the spacer ring 36 and shaft 11, to assist in holding the body section 44 in place.

The section 45 of the body of each stationary member 25, as shown in FIGS. 14 and 22, is in the form of a casting which is wedge-shaped in cross section and arcuate. The section 45 is secured to the section 44 so as to extend upwardly and arcuately therefrom about the axis of the rotary members 24 between the latter. Like the section 44, the section 45 is provided with mounting collars 54 adapted to be supported on horizontal rods 55 (see FIGS. 9 and 13) extending outwardly from the housing in the manner of the extensions 52 of the rods 17.

The body section 45 of each stationary member 25 is channelled in cross section, and decreases in width from the lower end thereof secured to the body section 44, to the upper end thereof. Portions of the side walls 45a of the section 45 are perforated in the same manner as the pressure plates 49. The lower end of the section 45 (see FIG. 14) is closed by a web member 57 which abuts the narrower end member 48 of the body section 44 and is bolted thereto as at 58. The web member 57 is provided with a groove 59 to receive a tongue 60 on the adjacent member 48, whereby the joined ends of the body sections 44 and 45 are maintained in alignment with one another. This assures that the outer surfaces of the side walls 45a of the section 45 will constitute a continuation of the outer surfaces of the pressure plates and form with the latter the side walls 25a of the stationary member 25 as a whole.

The varying width of the body section 45 causes the side walls 45a to diverge from the upper end to the lower end of these walls. Thus the side walls 45a and converging portions of the pressure plates 49 are arranged to converge toward the convex surfaces of the rotary members 24 in the direction of rotation of the latter, so that two of the gradually narrowing fruit-receiving spaces are provided between each pair of the rotary members and the associated stationary member 25.

The body section 45 of each of the stationary members 25 supports one of the arcuate bisecting knives 26 and a plurality of the slitting knives 27. The section 45 is provided with a groove 62 on the concave side thereof to receive the rib 63 on the convex back of the knife 26, the knife being secured to the member 45 by suitable fastening means 64. The curved cutting edge of the knife 26 intersects the paths of advance of the whole fruit in such a manner that each piece of fruit advanced by and between the rotary members 24, regardless of size will be bisected upon encountering the knife.

As shown in FIGS. 9, 14, and 22, a plurality of the slitting knives 27 are provided along the back or convex edge of the bisecting knife 26. These slitting knives are arranged so that each fruit half advanced along opposite sides of the knife will be given the same number of slits across the cut faces and rind edges thereof. FIG. 26 shows a typical slitting of a fruit half wherein three slits are made therein.

It is desired that the same number of slits be made in each fruit half, regardless of the size of the half, in order that the halves when subjected to the juice extracting pressure, may be flattened without being subjected to pressures which would abrade the rind surfaces and cut edges to the extent that an objectionable amount of rind oil and albedo would be released.

As fruit halves of a wide range of sizes are simultaneously treated in the apparatus, it is desired to make a like number of slits given depth in the smaller halves, as well as in the larger halves. To this end, the slitting knives 27 are more closely spaced adjacent the lower end of the bisecting kife 26. In other words, the slitting knives 27 are progressively more closely spaced in the direction of rotation of the rotary members, that is, in the direction of advance of the fruit. The depth of these slits is controlled so that each slit has a depth less than the distance between the cut faces and peaks of the fruit halves. For this purpose, the slitting knives are progressively smaller, that is, extend laterally a lesser extent into the paths of the fruit toward the axis of the rotary members 24.

Each of the slitting knives 27 is in the form of a generally flat triangular blade mounted in a slot 65 formed in the concave side of the body section 45, there being a notch 66 in the wider end of the blade to receive part of the back of the body section 45 so as to center the knife thereon. In the smaller end of each blade, is a notch 67 which receives the rib 63 on the bisecting knife 26. This disposes the inclined cutting edges 27a and 27b of each blade on opposite sides of the knife 26 and member 65, in the paths of the fruit halves moving past the bisecting knife. As the cut faces of the fruit halves slide along opposite faces of each bisecting knife 26, the cutting edges 27a and 27b of the knives 27 slice through the leading and trailing portions of the edges of the rind, as well as across the cut faces, with the depth of the cuts increasing as the fruit advances.

The resilient cushioning members 40 are in the form of circular discs of resilient rubber or synthetic rubber, secured to the convex surfaces of the members 24 by means of the fastenings 69 located as shown in FIGS. 17 and 18, intermediate inner and outer margins of the members 40 and extending into but not through these members. Other fastenings 70 including annular members 70' embedded in the members 40 secure the outer marginal portions of the members 40 to the outer margins of the members 24. At the inner margins of the members 40 are annular members 71 embedded therein and extending between the wear plates and the hubs of the members 24, being secured to the hubs 47 by the fastenings 72.

As it is desired to extract all of the available juice with a minimum of rind oil and albedo, the cushioning elements 40 are constructed and arranged so that the fruit-engaging surfaces thereof vary as to yieldability radially of the rotary members, whereby the fruit will be subjected to pressures determined according to the size of the fruit and the position thereof with respect to the axis of the rotary members during the advance of the fruit. This variation of yieldability is such that the cushioning elements have progressively less yieldability toward the inner periphery thereof, in consideration of the fact that the opposed surfaces of these cushioning elements converge toward their inner peripheries and therefore cause the fruit deposited therebetween to be wedged and held at different distances, with respect to this inner periphery. This arrangement is desirable inasmuch as the smaller fruit which on the average has less juice and less peel thickness than the larger fruit, is caused to travel in the shorter arcuate paths nearer to the axis of the rotary members than the larger fruit. The larger fruit, on the other hand, usually has greater peel thickness and a greater amount of juice and therefore travels in longer pressure paths than the smaller fruit, which pressure paths are in the zone of greater yieldability of the cushioning members while the smaller fruit is in the zone of lesser yieldability.

Accordingly, less pressure is applied to fruit of larger sizes than to the fruit of smaller sizes and this pressure control is such that it will cause all of the juice to be released, regardless of the size of the fruit without subjecting the rind or peel to pressures which would cause the release of objectionable amounts of rind oil, or other objectionable components.

One way in which this variable pressure may be provided is to form on the inner side of the cushioning elements a series of concentric ribs 73 which are progressively thicker, towards the inner perimeter of the cushioning members, as will be apparent with reference to FIG. 18. Radially extending rows of small webs 74, as shown in FIGS. 18 and 27, join the ribs 73 to provide the desired reinforcing thereof. It should be noted that any means whereby this variable yieldability is provided, may be resorted to, the ribs here shown being but one example of how this may be accomplished.

The cushioning elements 40 are provided with fruit-engaging surfaces of such form and arrangement as will maintain fruit of different sizes in predetermined positions with respect to the cushioning elements throughout the advance of the fruit in the apparatus. This arrangement not only assures that the fruit will be bisected and slit across the cut faces and rind edges in the desired manner, but causes each fruit half, according to size thereof, to be subjected to a particular pressure which will produce a maximum yield of juice with a minimum amount of albedo and rind oil.

Accordingly, the fruit engaging surfaces of the cushioning members 40 are provided with arcuate grooves 75, as shown in FIGS. 9, 28 and 29. Each arcuate groove 75 ranges spirally across the face of each cushioning member 40, generally in the direction of rotation of the rotary members 24 and has its concave side facing in that direction. Moreover, each groove is gradually reduced in width from the outer end thereof toward its inner end and is bevelled as at 75a along its concave margin and forms a shoulder 75b at its convex margin, also a flat bottom surface 75c between these margins.

Whole fruit when fed through the openings 29 in the housing 5 is guided by chutes 77 so as to roll between the rotary members 24. The chutes 77 (see FIG. 9) are fastened to the mounting hubs 47 of the stationary members 25, and to a horizontal supporting member 78 extending from the adjacent wall of the housing 1.

Upon entering the fruit-receiving spaces between the rotary members 24, the fruit will wedge into the complementary grooves 75 of the opposed cushioning members 40 of each pair of the rotary members 24. According to sizes, the whole fruit will come to rest at different distances from the axis of the rotary members within the portions of the grooves 75 having the width to accommodate the fruit. As shown in FIGS. 10 and 28, large sized fruit will occupy positions in grooves 75 nearer to the outer periphery of the members 40, whereas the smaller fruit will occupy positions nearer the inner periphery of the members 40.

FIGS. 10, 11, 12 and 28 show how whole citrus fruits of different sizes are engaged in the grooves 75 with the rind surfaces having a large area thereof engaged with the flat surfaces 75c of the grooves, while the shoulders 75b also contact the rind surfaces. With reference to FIGS. 10, 11, 12 and 28, it will be apparent that fruit engaged as there shown, in the grooves 75, will be securely held against dislodgement during rotation of the members 24. As the fruit is advanced, for example as shown in FIG. 28, while held in the grooves 75, it will encounter the bisecting knives 26 at such an angle as to cause the fruit to be more firmly wedged between the cushioning members 40 during the bisecting of the fruit. The beveled edges 75a make it possible for the bisecting knife 26 to force the fruit somewhat inwardly during the bisecting operation, thereby more firmly wedging the fruit in the grooves 75. This inward movement of the fruit during the bisecting operation is effected without abrading or cutting into the rind surface of the fruit and releasing an objectionable amount of rind oil, due to the fruit moving freely over the bevelled edges 75a to the grooves 75. However, the shoulders 75b are normal to the flat bottom surfaces 75c and lock the fruit tightly in the grooves as well as prevent outward radial displacement of the fruit during the advance thereof by the rotary members 24.

It should be noted with reference to FIGS. 9 and 28 that the grooves 75 are spaced one from the other so that fruit wedged in one groove will not extend over into the adjacent grooves. This spacing is such that the surfaces or lands of the cushioning members 40 between the grooves 75 are wider than the grooves. As shown at the lower side of FIG. 28, the spacing of the groove is of particular importance at the time the fruit is flattened and advanced in the sector in which the pressure applying surfaces are parallel to one another. In FIG. 28 this sector is indicated as between the dot-dash lines a—b. If the fruit pieces overlap, particularly when pressure is applied or when the fruit is flattened, the overlapping portions would be subjected to undue pressure causing an objectionable release of rind oils and albedo.

Channel shaped arcuate baffled members 80 are supported upon the horizontal rod 78 in a position to catch any juice that might be centrifugally thrown off of the rotary members 24 during rotation of the latter. Juice encountering these baffles will run down into the collection zone 81 in the lower end of the housing 5 and discharge through the spout 82 with the juice otherwise extracted.

Means are provided for washing and cleaning the apparatus. As shown in FIG. 6, a pipe 83, having an inlet end 84, extends upwardly within the housing 1 and is connected through a wall of the housing 1 with a horizontally disposed pipe 85 in the housing 5. Communicating in any suitable manner with the pipe 85 are a series of spray pipes 86 extending partially around the entire juice extracting mechanism 4. These pipes 86 have spray nozzles 87 located to direct steam or hot water for an effective cleaning of parts of the apparatus. The structures of the rotary members 24 may be cleaned by introducing steam or hot water through openings 88 in the mounting hubs 47. Pipes 89 and 90 (see FIGS. 9 and 7) leading to these openings from the pipe 84 provide for the introduction of steam or hot water for this cleaning operation.

It is believed that the construction and operation of apparatus forming the subject matter of this invention, is clear from the foregoing description and accompanying drawings, but to assure complete understanding of the apparatus, the operation thereof is briefly summarized as follows:

Whole citrus fruit of different sizes is fed by means of the conveyor 28, shown in FIG. 2, through the openings 29 in the housing 5, onto the guide chutes 77 and into the fruit receiving spaces between the rotary members 24. The fruit is fed to the apparatus in timed relation to the speed of rotation of the rotary members 24. It is desired to operate the apparatus at a comparatively high speed, with the feed of the whole fruit such that one piece of fruit at a time from each opening 24 is allowed to become wedged at its proper place between the rotary members 24 of each pair.

Pieces of fruit of different size, as indicated at the top of FIG. 28, will assume the approximate positions there shown, in being advanced to the bisecting knives 26. As the fruit is advanced, it will be bisected by the knives 26 and will pass along the sides of the knives into engagement with the slitting knives 27 which will make the slits, for example as indicated in FIG. 26, across the cut faces and rind edges of the fruit halves. Continued advance of the fruit as effected by the rotation of the members 24, causes the fruit to be gradually compressed in the pressure paths defined between the cushioning members 40 and the sides 25a of the stationary members 25. During this advance through the pressure paths the cut faces of the fruit halves move along the perforate side walls 25a of the stationary members 25 while the rind or peel surfaces are yieldably engaged with the cushioning member 40. This pressure progressively increasing in these paths causes the fruit to be susbtantially flattened when it reaches the sector wherein the surfaces of the paths are parallel, this sector being between the lines "a" and "b" in FIG. 28. During this subjecting of the fruit halves to juice extracting pressure, the juices will gravitate between the walls 45a of the stationary member 25 and pass through the perforations in these walls so as to collect in the lower part of the housing, thence to run off into the discharge spout 82, as will be apparent with reference to FIG. 9.

The spent fruit is discharged from the stationary members and the rotary members at the point designated D, seen in FIG. 9, and drops through a discharge chute 43.

It is important to note that the apparatus of the present invention constitutes an improvement in this art in providing cushioning members on the rotary fruit advancing members, having varying degrees of yieldability such that the size for the fruit and the position thereof in spaced relation to the axis of the rotary members, determines the pressure to which the fruit will be subjected in a manner assuring maximum yields of the desired juice with a minimum amount of rind oil and albedo.

Another improvement is the formation of arcuate, spirally ranging grooves in the cushioning elements of the rotary members, wherein the grooves are spaced to prevent the fruit in one groove overlapping fruit in another groove, and wherein the cross sectional shape of the groove assures a complete flattening and consequent juice expression therefrom without subjecting the fruit to such pressure as would release objectionable amounts of undesirable components thereof.

A further advantageous feature is the particular spacing of the slitting knives to assure that each fruit half, regardless of size, will be given a prescribed number of slits of predetermined depth across the rind edges and cut faces thereof, whereby a maximum yield of juice may be obtained with a minimum of release of rind oils and albedo.

Another feature of importance is the particular construction and arrangement of the stationary pressure applying members between the rotary fruit advancing members such that a more efficient juice extracting operation will take place.

We claim:

1. In a fruit juice extractor: means for simultaneously advancing fruit of different sizes in one direction in paths spaced one from the other transversely of said direction according to the size of the fruit; and means cooperable with said advancing means providing fruit-engaging surfaces of varying yieldability operable in said paths during said advance for subjecting the fruit in each of said paths to a different juice extracting pressure.

2. In a fruit juice extractor: means for simultaneously advancing fruit of different sizes in one direction in paths spaced one from the other transversely of said direction according to the size of the fruit; and means cooperable with said advancing means providing fruit-engaging surfaces of varying yieldability operable in said paths during said advance for subjecting the fruit in said paths to juice extracting pressures which differ in duration and force in each path.

3. In a fruit juice extractor: opposed members having converging surfaces cooperable for simultaneously advancing fruit of different sizes in one direction in paths spaced one from the other transversely of said direction according to the size of the fruit; and means cooperable with said members for subjecting the fruit in each of said paths to a different juice extracting pressure; said last named means including resilient cushioning fruit-engaging members which vary in yieldability in said transverse direction.

4. In a fruit juice extractor: members having opposed surfaces converging and cooperable for simultaneously advancing fruit of different sizes in one direction in paths spaced one from the other transversely of said direction according to the size of the fruit; and means cooperable with said members for subjecting the fruit in each of said paths to a different juice extracting pressure; said last named means including resilient cushioning members between which the fruit is wedged and which vary as to yieldability in said transverse direction.

5. In a fruit juice extractor: fruit advancing members having opposed surfaces converging in the direction in which it is desired to advance the fruit as well as transversely of said direction cooperable for simultaneously advancing fruit of different sizes in one direction in paths spaced one from the other transversely of said direction according to the size of the fruit; and means cooperable with said members for subjecting the fruit in said paths to juice extracting pressures which differ in duration and force in each path; said last named means including opposed cushioning members between which the fruit is wedged and which varies in yieldability in said transverse direction.

6. In a fruit juice extractor: a stationary pressure applying member; a movable pressure applying member; means mounting said members in opposed relation to one another; and means on one of said members providing a resilient, cushioning fruit-engaging surface opposed to a surface of the other of said members; said opposed surfaces of said members converging in the direction of movement of said movable member as well as transversely of said direction; said cushioning surface varying as to yieldability in said transverse direction; said converging surfaces cooperating responsive to said movement of said movable member to advance along the converging surface of said stationary member in said direction of movement, fruit of different sizes deposited between said surfaces, whereby said fruit will be subjected to a progressively increasing juice extracting pressure during said advance thereof.

7. In a fruit juice extractor: a stationary pressure applying member; a rotary pressure applying member arranged to rotate in one direction; means mounting said members in opposed relation to one another; and means on one of said members providing a resilient, cushioning fruit-engaging surface opposed to a surface of the other of said members; said opposed surfaces converging in said direction of rotation of said rotary member, also converging toward the axis of said rotary member; said cushioning surfaces decreasing in yieldability toward said axis; said surfaces cooperating upon said rotation of said rotary member to advance between said surfaces, fruit of different sizes deposited between said members, whereby the fruit will be subjected to progressively increasing juice extracting pressure between said surfaces during said advance of the fruit.

8. In a fruit juice extractor: a stationary pressure applying member; a rotary pressure applying member arranged to rotate in one direction; means mounting said members in opposed relation to one another; and means on said rotary member providing a resilient cushioning fruit engaging surface opposed to a surface of said stationary member; said opposed surfaces converging in said direction of rotation of said rotary member, also converging toward the axis of said rotary member; said cushioning surface decreasing in yieldability toward said axis; said surfaces cooperating upon said rotation of said rotary member to advance along said surface of said stationary member, fruit of different sizes deposited between said members, whereby the fruit will be subjected to progressively increasing juice extracting pressure between said surfaces during said advance of the fruit.

9. In a fruit juice extractor: a pair of rotary members; means mounting said rotary members for rotation about a common axis; means providing a resilient, cushioning fruit-engaging surface on one of said members; the other of said members having a fruit-engaging surface opposed to said cushioning surface; said opposed surfaces converging toward said axis to provide between said members a wedge-shaped fruit-receiving space such that fruit of different sizes deposited in said space will be wedged between said surfaces and advanced upon rotation of said members; said cushioning surface having progressively less yieldability toward said axis; and means cooperable with said members for subjecting said fruit to juice extracting pressure during said advance of the fruit.

10. In a fruit juice extractor: a pair of rotary members; means mounting said rotary members for rotation about a common axis; means providing a resilient cushioning fruit-engaging surface on one of said members; the other of said members having a fruit-engaging surface opposed to said cushioning surface; said opposed surfaces converging toward said axis to provide between said members a wedge shaped fruit-receiving space such that fruit of different sizes deposited in said space will be wedged between said surfaces and advanced upon rotation of said members; a stationary member in said space between said members; said stationary member having surfaces opposed to said surfaces of said rotary members and converging toward said surfaces of said rotary members in said direction of rotation; means between said surfaces of said rotary members in advance of said stationary member for bisecting the fruit and guiding the halved fruit onto said opposed surfaces of said stationary member during said advance of said fruit, said cushioning surface decreasing progressively in yieldability toward said axis.

11. In a fruit juice extractor: a pair of rotary members; means mounting said rotary members for rotation about a common axis; said rotary members having opposed resilient cushioning surfaces which converge towards said axis; said cushioning surfaces decreasing in yieldability towards said axis and defining therebetween a wedge-shaped fruit receiving space such that fruit of different sizes deposited in said space will be wedged between said surfaces at different distances from said axis according to the size of the fruit and will be advanced upon rotation of said members; and means cooperable with said members for subjecting the fruit to juice extracting pressures during said advance of the fruit.

12. In a fruit juice extractor: a stationary pressure applying member; a rotary pressure applying member arranged to rotate in one direction; means mounting said members in opposed relation to one another; and a resilient cushioning element on said rotary member having a fruit-engaging surface on one side and means on the other side rendering said surface progressively less yieldable toward the axis of said rotary member; said stationary member having a fruit-engaging surface opposed to said fruit-engaging surface of said cushioning element; said surfaces converging in said direction of rotation of said rotary member, also converging toward said axis; said surfaces cooperating upon said rotation of said rotatable member, to advance along said surface of said stationary member, in said direction of rotation, fruit of different sizes deposited between said members.

13. In a fruit juice extractor: a stationary pressure applying member having an arcuate fruit-engaging surface; a rotary circular pressure applying member having a surface opposed to said fruit-engaging surface of said stationary member; an arcuate resilient cushioning element on said surface of said rotary member; said element providing on its outer face a fruit-engaging surface; and a series of concentric ribs on the inner face of said element, said ribs increasing in size toward the axis of said rotary member whereby said fruit-engaging surface of said element is progressively less yieldable toward said axis, said fruit-engaging surfaces of said members converging in the direction of rotation of said rotary member and also converging toward said axis, said fruit-engaging surfaces cooperating responsive to rotation of said rotary member, to advance along said surface of said stationary member, fruit of different sizes deposited between said members.

14. In a fruit juice extractor: a stationary pressure applying member having an arcuate fruit-engaging surface; a rotary circular pressure applying member having a surface opposed to said fruit-engaging surface of said stationary member; an arcuate resilient cushioning element on said surface of said rotary member; said element providing on its outer face a fruit-engaging surface; said resilient element having a series of arcuate grooves ranging across the fruit-engaging surface thereof from adjacent the axis of said rotary member toward the outer edge of said element in the general direction of rotation of said rotary member; said fruit engaging surfaces converging in the direction of rotation of said rotary member and also converging toward said axis to define between said members an arcuate fruit receiving space such that fruit of different sizes entering said space will be held by said fruit-engaging surfaces at different distances from said axis according to the size of the fruit and will be advanced along said fruit-engaging surface of said stationary member upon rotation of said rotary member; said grooves progressively decreasing in width toward said axis; said grooves having a width throughout the length thereof such that fruit held at said different distances will be engaged against the bottoms of said grooves; said cushioning element progressively decreasing in yieldability toward said axis.

15. In a fruit juice extractor: a stationary pressure applying member having an arcuate fruit-engaging surface; a rotary circular pressure applying member having a surface opposed to said fruit-engaging surface of said stationary member; an arcuate resilient cushioning element on said surface of said rotary member; said element providing on its outer face a fruit-engaging surface; said resilient element having a series of arcuate grooves ranging across the fruit-engaging surface thereof from adjacent the axis of said rotary member toward the outer edge of said element in the general direction of rotation of said rotary member; said fruit engaging surfaces converging in the direction of rotation of said rotary member and also converging toward said axis to define between said members an arcuate fruit receiving space such that fruit of different sizes entering said space will be held by said fruit engaging surfaces at different distances from said axis according to the size of the fruit and will be advanced along said fruit-engaging surface of said stationary member upon rotation of said rotary member; said grooves progressively decreasing in width toward said axis; said cushioning element having flat surfaces between said grooves of greater width than said grooves.

16. In a fruit juice extractor: a stationary pressure applying member having an arcuate fruit-engaging surface; a rotary circular pressure applying member having a surface opposed to said fruit-engaging surface of said stationary member; an arcuate resilient cushioning element on said surface of said rotary member; said element providing on its outer face a fruit-engaging surface; said resilient element having a series of arcuate grooves ranging across the fruit-engaging surface thereof from adjacent the axis of said rotary member toward the outer edge of said element in the general direction of rotation of said rotary member; said fruit engaging surfaces converging in the direction of rotation of said rotary member also converging toward said axis to define between said members an arcuate fruit receiving space such that fruit of different sizes entering said space will be held by said fruit engaging surfaces at different distances from said axis according to the size of the fruit and will be advanced along said fruit-engaging surface of said stationary member upon rotation of said rotary member; said grooves progressively decreasing in width toward said axis; said grooves having a width throughout the length thereof such that fruit held at said different distances will be engaged against the bottoms of said grooves; said cushioning element progressively decreasing in yieldability toward said axis; each of said grooves having a beveled portion along one edge thereof, a substantially flat bottom and a shoulder substantially normal to said bottom along the other edge thereof.

17. In a fruit juice extractor: a stationary pressure applying member having an arcuate fruit-engaging surface; a rotary circular pressure applying member having a surface opposed to said fruit-engaging surface of said stationary member; an arcuate resilient cushioning element on said surface of said rotary member; said element providing on its outer face a fruit-engaging surface; said resilient element having a series of arcuate grooves ranging across the fruit-engaging surface thereof from adjacent the axis of said rotary member toward the outer edge of said element in the general direction of rotation of said rotary member; said fruit-engaging surfaces converging in the direction of rotation of said rotary member also converging toward said axis to define between said members an arcuate fruit receiving space such that fruit of different sizes entering said space will be held by said fruit-engaging surfaces at different distances from said axis according to the size of the fruit and will be advanced along said fruit-engaging surface of said stationary member upon rotation of said rotary member; said grooves progressively decreasing in width toward said axis; said cushioning element having flat surfaces between said grooves of greater width than said grooves; and a plurality of concentric ribs on the inner face of said element; said ribs decreasing in size toward said axis whereby said fruit-engaging surface of said element is progressively less yieldable toward said axis.

18. In a fruit juice extractor: a stationary pressure applying member having an arcuate fruit-engaging surface; a rotary circular pressure applying member having a surface opposed to said fruit-engaging surface of said stationary member; an arcuate resilient cushioning element on said surface of said rotary member; said element providing on its outer face a fruit-engaging surface; said fruit-engaging surfaces converging in the direction of rotation of said rotary member also converging toward the axis of said rotary member to provide between said members an arcuate fruit receiving space such that halved fruit of different sizes in said space will be held at different distances from said axis according to the size of the fruit and will be advanced along said fruit-engaging surface of said stationary member upon rotation of said rotary member; and a plurality of slitting knives between said members operable to cut across the cut faces and rind edges of the fruit halves during rotation of said rotary members; said knives being progressively more closely spaced from one another toward said axis.

19. In a fruit juice extractor: a stationary pressure applying member having an arcuate fruit-engaging surface; a rotary circular pressure applying member having a surface opposed to said fruit-engaging surface of said stationary member; an arcuate resilient cushioning element on said surface of said rotary member; said element providing on its outer face a fruit-engaging surface; said fruit-engaging surfaces being converged in the direction of rotation of said rotary member also converged toward the axis of said rotary member; said fruit-engaging surfaces cooperating to maintain halved citrus fruit of different sizes at different distances from said axis and to advance the cut faces of the fruit over said surface of said stationary member upon rotation of said rotary member; slitting knives; and means supporting said knives in a row between said members in position to make a plurality of slits across the cut faces and rind edges of the halved fruit during said advance of said halved fruit, said knives being progressively more closely spaced toward said axis.

20. In a fruit juice extractor: a stationary pressure applying member having an arcuate fruit-engaging surface; a rotary circular pressure applying member having a surface opposed to said fruit-engaging surface of said stationary member; an arcuate resilient cushioning element on said surface of said rotary member; said element providing on its outer face a fruit-engaging surface; said fruit-engaging surfaces being converged in the direction of rotation of said rotary member also converged toward the axis of said rotary member; said fruit-engaging surfaces cooperating to maintain halved citrus fruit of different sizes at different distances from said axis and to advance the cut faces of the fruit over said surface of said stationary member upon rotation of said rotary member; slitting knives; and means supporting said knives in a row between said members in position to make a plurality of slits across the cut faces and rind edges of the halved fruit during said advance of said halved fruit, said knives being progressively more closely spaced toward said axis; said knives decreasing in size toward said axis whereby the depth of the cuts decreases toward said axis.

21. In a fruit juice extractor: a pair of rotary members; means mounting said rotary members for rotation about a common axis; means providing a resilient, cushioning fruit-engaging surface on one of said members; the other of said members having a fruit-engaging surface opposed to said cushioning surface; said opposed surfaces converging toward said axis to provide between said members a wedge-shaped fruit-receiving space such that whole citrus fruit of different sizes deposited in said space will be wedged between said surfaces at different distances from said axis according to the size of the fruit and will be advanced upon rotation of said rotary members; a bisecting knife mounted between said members for bisecting the fruit as it is advanced; a plurality of slitting knives mounted in a row in said space beyond said bisecting knife for making a plurality of slits in each fruit half advanced past said bisecting knife, said slitting knives being more closely spaced in said row adjacent said axis; and means between said members mounted in said space beyond said slitting knives cooperable with said surfaces for subjecting the halved fruit to juice extracting pressure during rotation of said rotary member.

22. In a fruit juice extractor: a pair of rotary members; means mounting said rotary members for rotation about a common axis; said rotary members having opposed resilient cushioning surfaces which converge towards said axis; said cushioning surfaces decreasing in yieldability towards said axis and defining therebetween a wedge-shaped fruit-receiving space such that fruit of different sizes deposited in said space will be wedged between said surfaces at different distances from said axis according to the size of the fruit and will be advanced upon rotation of said members; a bisecting knife mounted between said members in a position to bisect the fruit advanced by said rotary members; a plurality of slitting knives mounted in a row beyond said knife between said members for making a plurality of slits in each fruit half; said slitting knives being arranged to make cuts of different depths in the fruit halves and being progressively more closely spaced from one another in said row toward said axis.

23. In a fruit juice extractor: a pair of opposed rotary members; means mounting said members for rotation about a common axis, said rotary members having opposed, resilient cushioning fruit-engaging surfaces which converge toward said axis and have progressively less yieldability toward said axis; said opposed converging surfaces defining between said rotary members an annular wedge-shaped fruit-receiving space such that fruit of different sizes deposited in said space will be wedged between said surfaces at different distances from said axis according to the size of the fruit and will be advanced upon rotation of said members; a stationary member occupying a portion of said wedge-shaped space, said stationary member having walls which converge toward said opposed surfaces of said rotary members in the direction of rotation of said rotary members to define therewith a pair of converging paths on opposite sides of said stationary member; and cutting means between said rotary members in advance of said stationary member to cut fruit advanced by said rotary members.

24. In a fruit juice extractor: a pair of opposed rotary members; means mounting said members for rotation about a common axis, said rotary members having opposed, resilient cushioning fruit-engaging surfaces which converge toward said axis and have progressively less yieldability toward said axis; said opposed converging surfaces defining between said rotary members an annular wedge-shaped fruit-receiving space such that fruit of different sizes deposited in said space will be wedged between said surfaces at different distances from said axis according to the size of the fruit and will be advanced upon rotation of said members; a stationary member occupying a portion of said wedge-shaped space, said stationary member having walls which converge toward said opposed surfaces of said rotary members in the direction of rotation of said rotary members to define therewith a pair of converging paths on opposite sides of said stationary member; and cutting means between said rotary members in advance of said stationary member to cut fruit advanced by said rotary members.

25. In a fruit juice extractor: a pair of opposed members; means mounting said members for rotation about an axis; said members having opposed resilient yieldable surfaces converging in a direction toward said axis for gripping and advancing fruit therebetween in different arcuate paths variously radially spaced from said axis according to the size of the fruit; said surfaces progressively decreasing in yieldability toward said axis; knife means between said surfaces for cutting fruit during said advance; and a stationary member between said surfaces rearwardly of said knife means and diverging in the direction of said advance to cooperate with said surfaces to express juice from the cut fruit during said advance.

26. In a fruit juice extractor: a pair of opposed rotary members; means mounting said members for rotation about a common axis, said rotary members having opposed, resilient cushioning fruit-engaging surfaces which converge toward said axis and have progressively less yieldability toward said axis; said opposed converging surfaces defining between said rotary members an annular wedge-shaped fruit-receiving space such that fruit of different sizes deposited in said space will be wedged between said surfaces at different distances from said axis according to the size of the fruit and will be advanced upon rotation of said members; a stationary member occupying a portion of said wedge-shaped space; said stationary member having walls which converge toward said opposed surfaces of said rotary members in the direction of rotation of said rotary members to define therewith a pair of converging paths on opposite sides of said stationary member; a bisecting knife between said rotary members for bisecting fruit advanced by said rotary members; said knife being in advance of said stationary member and arranged to guide the bisected fruit into said paths during rotation of said rotary members; said fruit engaging surfaces of said rotary members having a series of arcuate fruit-receiving grooves extending spirally thereacross; said grooves having widths to accommodate in said grooves fruit of different sizes at said different distances from said axis.

27. In a fruit juice extractor: a pair of rotary members; means mounting said rotary members for rotation about a common axis; means providing a resilient, cushioning fruit-engaging surface on one of said members; the other of said members having a fruit-engaging surface opposed to said cushioning surface; said opposed surfaces converging toward said axis to provide between said members a wedge-shaped fruit-receiving space such that whole citrus fruit of different sizes deposited in said space will be wedged between said surfaces at different distances from said axis according to the size of the fruit and will be advanced upon rotation of said rotary members; a bisecting knife mounted between said members for bisecting the fruit as it is advanced; a plurality of slitting knives mounted in a row in said space beyond said bisecting knife for making a plurality of slits in each fruit half advanced past said bisecting knife; said slitting knives being spaced both radially and circumferentially with respect to said axis and being progressively more closely spaced from one another toward said axis; and means between said members mounted in said space beyond said knives cooperable with said surfaces for subjecting each fruit half to juice extracting pressure during rotation of said rotary member.

28. In a fruit juice extractor: a pair of rotary members; means mounting said rotary members for rotation about a common axis; means providing a resilient, cushioning fruit-engaging surface on one of said members; the other of said members having a fruit-engaging surface opposed to said cushioning surface; said opposed surfaces converging toward said axis to provide between said members a wedge-shaped fruit-receiving space such that whole citrus fruit of different sizes deposited in said space will be wedged between said surfaces at different distances from said axis according to the size of the fruit and will be advanced upon rotation of said rotary members; a bisecting knife mounted between said members for bisecting the fruit as it is advanced; a plurality of slitting knives mounted in a row in said space beyond said bisecting knife for making a plurality of slits in each fruit half advanced past said bisecting knife; and means between said members cooperable with said surfaces for subjecting the halved fruit to juice extracting pressure during rotation of said rotary members; said fruit-engaging surfaces having arcuate grooves therein for holding fruit at said different distances during said bisecting and slitting of the fruit as well as while the fruit is being subjected to said juice extracting pressure; the portions of said surfaces between said grooves being of such greater width than said grooves that the pieces of fruit in said grooves are prevented from overlapping one another during said advance by said rotary members.

29. In a fruit juice extractor: a pair of opposed members cooperable to simultaneously advance in one direction therebetween fruit of different sizes; resilient means between said members providing a yieldable fruit engaging surface opposed to a fruit engaging surface of one of said members; said opposed fruit engaging surfaces converging transversely of said direction; and said yieldable means varying in yieldability transversely of said direction for simultaneously subjecting the fruit of different sizes to different juice extracting pressures during said advance.

30. In a fruit juice extractor: a pair of opposed members cooperable to simultaneously advance in one direction therebetween fruit of different sizes; resilient means on one of said members providing thereon a yieldable fruit engaging surface opposed to a fruit engaging surface of the other of said members; said opposed fruit engaging surfaces converging transversely of said direction; and said resilient means being constructed and arranged so that said yieldable surface progressively lessens in yieldability in the direction of said transverse convergence to simultaneously subject fruit of different sizes to different juice extracting pressures during said advance.

31. In a fruit juice extractor: a pair of opposed members for advancing in one direction fruit of different sizes in different paths according to the size of the fruit; resilient means on one of said members providing thereon a yieldable fruit engaging surface opposed to a fruit engaging surface of the other of said members along said paths; said opposed fruit engaging surfaces converging in said direction as well as transversely of said direction; and said resilient means being constructed and arranged so that said yieldable surface varies in yieldability transversely of said direction for simultaneously subjecting the fruit of different sizes to different juice extracting pressures during said advance.

References Cited in the file of this patent
UNITED STATES PATENTS

| | | |
|---|---|---|
| 2,084,229 | Van Maanen | June 14, 1937 |
| 2,149,017 | Gordon | Feb. 28, 1939 |
| 2,207,278 | Albrecht | July 9, 1940 |
| 2,538,590 | Polk | Jan. 16, 1951 |
| 2,637,064 | Miller | May 5, 1953 |
| 2,738,725 | Johnson | Mar. 20, 1956 |
| 2,767,644 | Bireley | Oct. 23, 1956 |
| 2,767,645 | Bireley | Oct. 23, 1956 |